(12) United States Patent
Joo

(10) Patent No.: US 8,583,151 B2
(45) Date of Patent: Nov. 12, 2013

(54) BEAMFORMING FOR WIRELESS COMMUNICATION

(75) Inventor: Jung Suk Joo, Gyeonggi-Do (KR)

(73) Assignee: Hankuk University of Foreign Studies Research and Industry-University Cooperation Foundation, Yongin-Si, Gyeonggi-do (KR)

( * ) Notice: Subject to any disclaimer, the term of this patent is extended or adjusted under 35 U.S.C. 154(b) by 0 days.

(21) Appl. No.: 13/576,277

(22) PCT Filed: Sep. 29, 2011

(86) PCT No.: PCT/KR2011/007193
§ 371 (c)(1),
(2), (4) Date: Jul. 31, 2012

(87) PCT Pub. No.: WO2013/047924
PCT Pub. Date: Apr. 4, 2013

(65) Prior Publication Data
US 2013/0084908 A1    Apr. 4, 2013

(51) Int. Cl.
*H04B 7/00* (2006.01)

(52) U.S. Cl.
USPC ........... 455/500; 455/440; 455/441; 455/297; 455/509

(58) Field of Classification Search
USPC ........... 455/500, 456.6, 456.1, 456, 414, 445, 455/425, 553.1, 101, 556.1, 525, 562.1, 455/456.5, 457, 41.2, 561, 73, 440, 441, 455/297, 509; 375/267, 260, 347, 346; 370/330, 328, 329, 347, 537
See application file for complete search history.

(56) References Cited

U.S. PATENT DOCUMENTS

| | | | |
|---|---|---|---|
| 6,731,940 B1 * | 5/2004 | Nagendran | 455/456.1 |
| 7,013,165 B2 | 3/2006 | Yoon et al. | |
| 8,068,872 B2 * | 11/2011 | Molnar et al. | 455/553.1 |
| 2003/0096621 A1 * | 5/2003 | Jana et al. | 455/456 |
| 2005/0105485 A1 | 5/2005 | Cleveland | |
| 2005/0136980 A1 * | 6/2005 | Kim et al. | 455/562.1 |
| 2006/0039494 A1 * | 2/2006 | Kim et al. | 375/267 |
| 2006/0094449 A1 * | 5/2006 | Goldberg | 455/456.6 |
| 2008/0070564 A1 * | 3/2008 | Li et al. | 455/424 |
| 2008/0268865 A1 * | 10/2008 | Tung | 455/456.1 |
| 2010/0054200 A1 * | 3/2010 | Tsai | 370/329 |
| 2010/0103900 A1 * | 4/2010 | Yeh et al. | 370/330 |
| 2010/0202367 A1 * | 8/2010 | Joo | 370/329 |
| 2011/0003608 A1 * | 1/2011 | Forenza et al. | 455/501 |
| 2012/0276849 A1 * | 11/2012 | Hyde et al. | 455/41.2 |
| 2012/0314654 A1 * | 12/2012 | Kotecha et al. | 370/328 |

FOREIGN PATENT DOCUMENTS

EP    2161854    1/2011

OTHER PUBLICATIONS

International Search Report from International Application No. PCT/KR2011/007193 mailed May 15, 2012.

* cited by examiner

*Primary Examiner* — Tan Trinh
(74) *Attorney, Agent, or Firm* — Brundidge & Stanger, P.C.

(57) ABSTRACT

Technologies are generally described for usage recommendation for mobile device. In some examples, a method performed under control of a downlink beamforming system may include receiving respective movement information of a plurality of mobile devices, grouping at least some of the mobile devices into one or more groups based on the movement information, and generating beams for the groups, respectively.

11 Claims, 6 Drawing Sheets

BEAMFORMING FOR WIRELESS COMMUNICATION

BACKGROUND ART

The usages of mobile devices have experienced a phenomenal growth in the last few years. A base station may generate directional beams by beamforming and provide the generated directional beams for a target mobile device. Thus, the base station can transmit signals to mobile devices with more efficiency. However, in order for the base station to generate the directional beams by beamforming, it is necessary to estimate a position and a velocity of each mobile device.

DISCLOSURE OF INVENTION

Solution to Problem

In an example, a method performed under control of a downlink beamforming system may include receiving respective movement information of a multiple number of mobile devices, grouping at least some of the mobile devices into one or more groups based on the movement information and generating beams for the groups, respectively.

In an example, a downlink beamforming system may include a receiving unit configured to receive movement information of a multiple number of mobile devices, a grouping unit configured to group at least some of the mobile devices into one or more groups based on the movement information and a beam generation unit configured to generate beams for the groups, respectively.

In an example, a computer-readable storage medium may have stored thereon computer-executable instructions that, in response to execution, cause a downlink beamforming system to perform operations including receiving respective movement information of a multiple number of mobile devices, grouping at least some of the mobile devices into one or more groups based on the movement information and generating beams for the groups, respectively.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
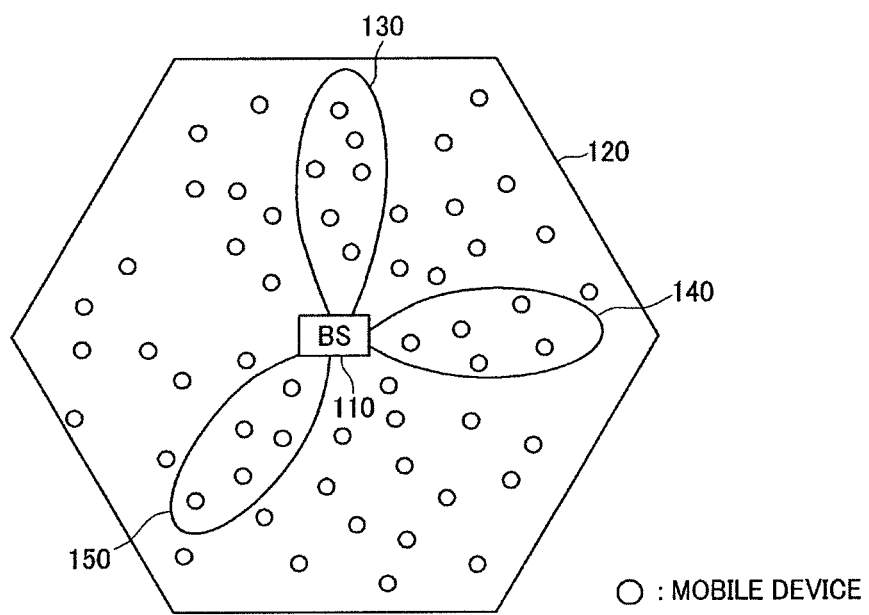
FIG. 1 shows an illustrative example in which a downlink beamforming system constructs narrow beams for at least one group of multiple mobile devices.

All arranged in accordance with at least some embodiments described herein.

MODE FOR THE INVENTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to usage recommendation for a mobile device.

Briefly stated, technologies are generally described for a downlink beamforming system configured to provide one or more groups of multiple mobile devices with narrow directional beams for wireless communications. In some examples, a base station including the downlink beamforming system may provide a narrow directional beam for a group of multiple mobile devices. The narrow directional beam may provide a spatial interference suppression gain.

In some examples, the beamforming system may group two or more mobile devices inside a cell covered by the base station into a low speed group and a high speed group based on velocities of the mobile devices. The beamforming system may regroup mobile devices of the low speed group into one or more sub-groups based on positions of the mobile devices. By way of example, but not limitation, the beamforming system may group mobile devices positioned in a predetermined range into a sub-group.

In some examples, the base station including the beamforming system may generate one or more narrow directional beams for the sub-groups and omni-directional beams for mobile devices other than the mobile devices of the sub-groups.

FIG. 1 shows an illustrative example in which a downlink beamforming system constructs narrow beams for at least one group of multiple mobile devices in accordance with at least some embodiments of the present disclosure.

As depicted in FIG. 1, a base station 110 may support a cell 120 as coverage for wireless communications. In some embodiments, base station 110 may construct one or more beams for mobile devices positioned inside cell 120. By way of example, but not limitation, base station 110 may construct one or more narrow directional beams 130, 140 and 150 for two or more mobile devices among the mobile devices positioned inside cell 120.

In some embodiments, base station 110 may construct narrow directional beams for two or more mobile devices having a movement speed slower than a predetermined speed and positioned in a similar direction from base station 110. By way of example, but not limitation, base station 110 may construct narrow directional beams for two or more mobile devices having a movement speed slower than a predetermined speed and positioned in a predetermined range associated with a predetermined direction from base station 110.

In some embodiments, base station 110 may construct omni-directional beams (not shown) for one or more mobile devices having a movement speed equal to or faster than a predetermined speed or not being grouped based on a predetermined direction from base station 110.

Thus, base station 110 may generate one or more narrow directional beams based on movement information including velocity information and position information of mobile devices positioned inside cell 120.

Figure 2:
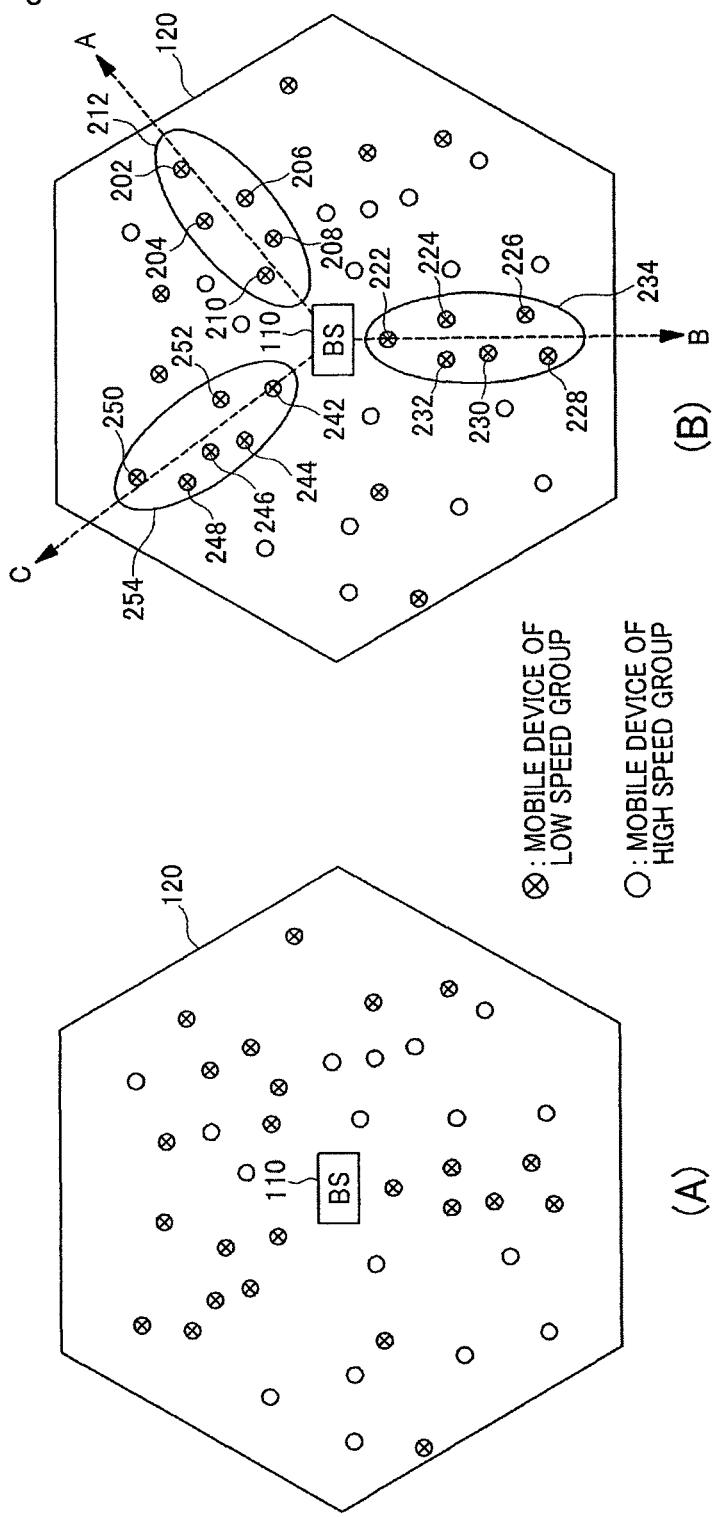
FIG. 2 shows an illustrative example in which a downlink beamforming system groups mobile devices positioned inside a cell based on velocities and positions of the mobile devices.

FIG. 2 shows an illustrative example in which a downlink beamforming system groups mobile devices positioned inside a cell based on velocities and positions of the mobile devices in accordance with at least some embodiments of the present disclosure.

As depicted in FIG. 2(A), the downlink beamforming system included in base station 110 may group mobile devices positioned inside cell 120 into a low speed group and a high speed group based on a predetermined speed. In some embodiments, the mobile devices positioned inside cell 120 may move at various speeds. The downlink beamforming system may classify, among the mobile devices positioned inside cell 120, one or more mobile devices moving slower than the predetermined speed into the low speed group and one or more devices moving equally fast or faster than the predetermined speed into the high speed group.

In some embodiments, speeds of the mobile devices positioned inside cell 120 may vary, and the downlink beamforming system may update velocity information of the mobile devices positioned inside cell 120 periodically and group the mobile devices positioned inside cell 120 into a low speed group and a high speed group periodically.

As depicted in FIG. 2(B), the downlink beamforming system may regroup multiple mobile devices of the low speed group into one or more sub-groups based on positions of the multiple mobile devices. In some embodiments, the downlink beamforming system may regroup, among multiple mobile devices of the low speed group, two or more mobile devices positioned in similar directions from base station 110 and positioned in a predetermined range into one or more sub-groups.

By way of example, but not limitation, the downlink beamforming system may regroup mobile devices 202, 204, 206, 208 and 210 positioned in similar directions to direction A from base station 110 and positioned in the predetermined range into a sub-group 212. Further, the downlink beamforming system may regroup mobile devices 222, 224, 226, 228, 230 and 232 positioned in similar directions to direction B and positioned in the predetermined range into a sub-group 234, and the downlink beamforming system may regroup mobile devices 242, 244, 246, 248, 250 and 252 positioned in similar directions to direction C and positioned in the predetermined range into a sub-group 254. The predetermined range may depend on a width of a narrow directional beam generated by base station 110.

Figure 3:
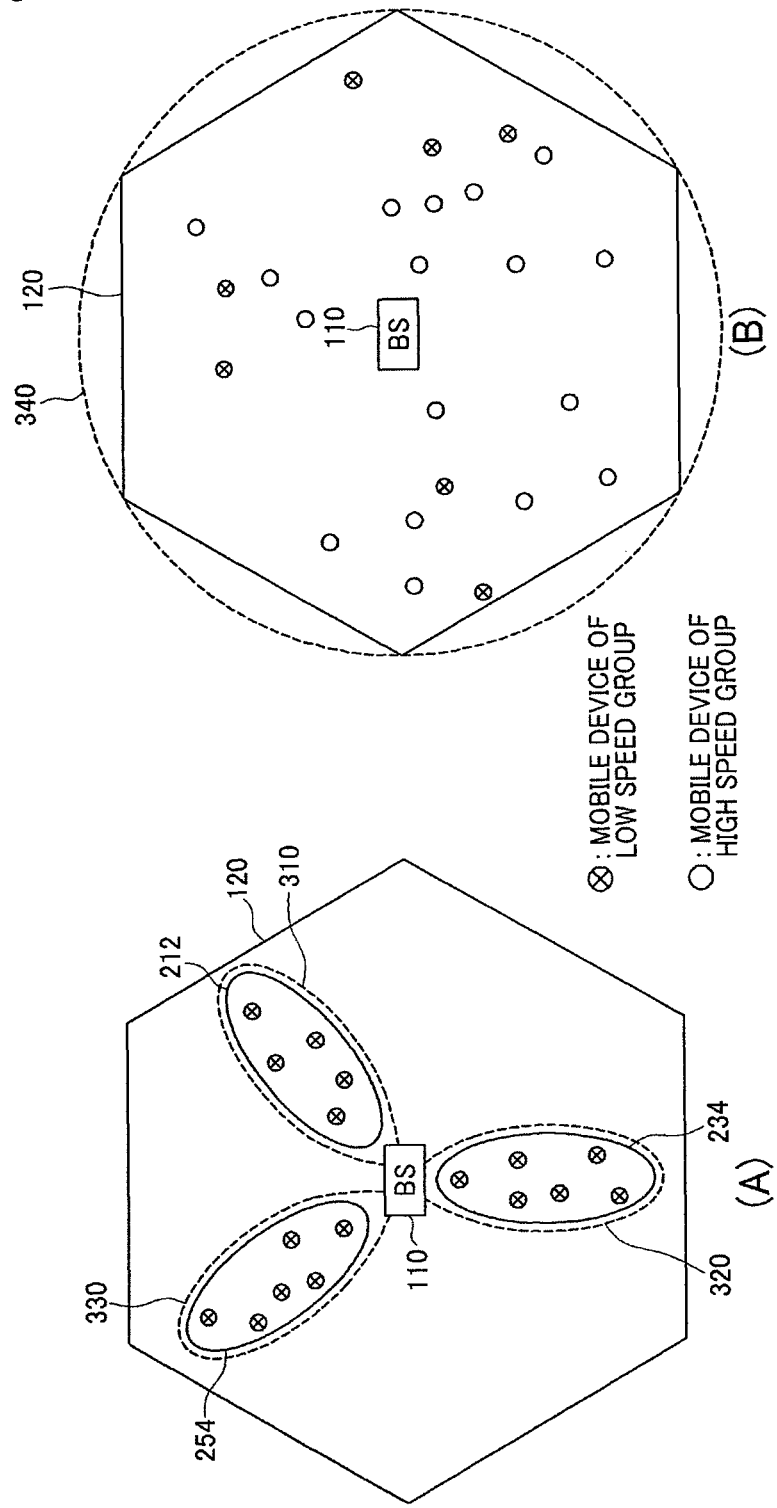
FIG. 3 shows an illustrative example in which the downlink beamforming system generates beams for the mobile devices positioned inside the cell.

FIG. 3 shows an illustrative example in which the downlink beamforming system generates beams for the mobile devices positioned inside the cell in accordance with at least some embodiments described herein.

As depicted in FIG. 3(A), the downlink beamforming system included in base station 110 may generate a narrow directional beam for a sub-group including multiple mobile devices. In some embodiments, the downlink beamforming system may generate narrow directional beams for one or more sub-groups including two or more mobile devices, among multiple mobile devices of the low speed group, positioned in similar directions from base station 110 and positioned in a predetermined range. By way of example, but not limitation, the downlink beamforming system may generate directional beams 310, 320 and 330 for sub-groups 212, 234 and 254, respectively.

As depicted in FIG. 3(B), the downlink beamforming system may generate an omni-directional beam 340 for one or more mobile devices of the mobile devices positioned inside cell 120 other than mobile devices included in sub-groups. In some embodiments, the downlink beamforming system may generate omni-directional beam 340, not narrow directional beams, for one or more mobile devices moving equal to or faster than a predetermined speed and/or one or more mobile devices moving slower than the predetermined speed but not belonging to sub-groups. In cases where the downlink beamforming system generates narrow directional beams for a mobile device moving faster than a predetermined speed or a mobile device positioned not to be included in a sub-group, the downlink beamforming system may need lots of energy to generate the narrow directional beams. Therefore, it may be inefficient that the downlink beamforming system generates the narrow directional beams for the one or more mobile devices other than the mobile devices included in one or more sub-groups. Thus, the downlink beamforming system may generate an omni-directional beam, not directional beams, for the one or more mobile devices other than the mobile devices included in the one or more sub-groups.

Figure 4:
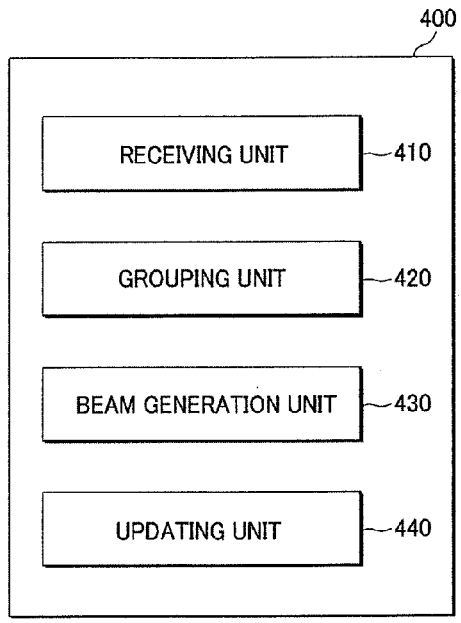
FIG. 4 shows a schematic block diagram illustrating an example of the downlink beamforming system.

FIG. 4 shows a schematic block diagram illustrating an example of a downlink beamforming system in accordance with at least some embodiments described herein. A downlink beamforming system 400 may include a receiving unit 410, a grouping unit 420, a beam generation unit 430 and an updating unit 440. Although illustrated as discrete components, various components may be divided into additional components, combined into fewer components, or eliminated, depending on the desired implementation.

Receiving unit 410 may be configured to receive movement information of multiple mobile devices. In some embodiments, the movement information may include velocity information of the mobile devices. By way of example, but not limitation, the movement information may include position information of a global positioning system (GPS) of each mobile device and velocity information base on the position information of the global positioning system.

Grouping unit 420 may be configured to group at least some of the mobile devices into one or more groups based on the movement information. In some embodiments, grouping unit 420 may group the mobile devices based on the movement information received by receiving unit 410. Grouping unit 420 may group at least some of the mobile devices into one or more groups based on the velocity information included in the movement information. In some embodiments, grouping unit 420 may include a classifying unit (not shown), which may classify the mobile devices into a low speed group and a high speed group based on the velocity information. A velocity of a mobile device in the low speed group may be slower than a predetermined velocity, while a velocity of a mobile device in the high speed group may be equal to or faster than the predetermined velocity.

The predetermined velocity may depend on the amount of energy consumed when downlink beamforming system 400 generates a new beam. As a velocity of a mobile device that receives a signal through a narrow directional beam becomes slow, the mobile device may maintain the generated narrow directional beam for long. By way of example, but not limitation, the predetermined velocity may be about 3-6 km/h, which is a walking pace of human beings.

In some embodiments, grouping unit 420 may include a regrouping unit (not shown) configured to regroup at least some of mobile devices in the low speed group into one or more sub-groups based on positions of the mobile devices in the low speed group. The sub-groups may include two or more mobile devices positioned in a predetermined range. By way of example, but not limitation, the regrouping unit may regroup, among the mobile devices in the low speed group, two or more mobile devices positioned in similar directions from base station 110 and positioned in the predetermined range into a sub-group.

Beam generation unit 430 may be configured to generate beams for the mobile devices. In some embodiments, beam generation unit 430 may generate beams for the mobile devices grouped by grouping unit 420. In some embodiments, beam generation unit 430 may generate one or more narrow directional beams and an omni-directional beam. Details of beam generation unit 430 will be provided below by reference to FIG. 5.

Updating unit 440 may be configured to update the movement information periodically. In some embodiments, movement speeds and positions of multiple mobile devices that receive signals through beams generated by downlink beamforming system 400 may vary. Therefore, updating unit 440 may update the movement information of the multiple mobile devices periodically and grouping unit 420 may regroup the groups based on the updated movement information into a low speed group, a high speed group and one or more sub-groups.

Figure 5:
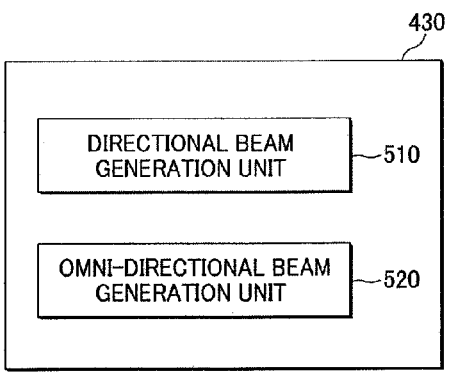
FIG. 5 shows a schematic block diagram illustrating an example of a beam generation unit.

FIG. 5 shows a schematic block diagram illustrating an example of beam generation unit 430 in accordance with at least some embodiments described herein. Beam generation unit 430 may include a directional beam generation unit 510 and an omni-directional beam generation unit 520. Although illustrated as discrete components, various components may be divided into additional components, combined into fewer components, or eliminated, depending on the desired implementation.

Directional beam generation unit 510 may generate one or more directional beams for respective sub-groups grouped by grouping unit 420. In some embodiments, directional beam generation unit 510 may generate one or more narrow directional beams for the mobile devices of the sub-groups grouped by grouping unit 420.

Omni-directional beam generation unit 520 may generate an omni-directional beam for at least one mobile device not belonging to the sub-groups. In some embodiments, omni-directional beam generation unit 520 may generate an omni-directional beam for one or more mobile devices, among the mobile devices of the high speed group and low speed group grouped by grouping unit 420, not belonging to the sub-groups.

Figure 6:
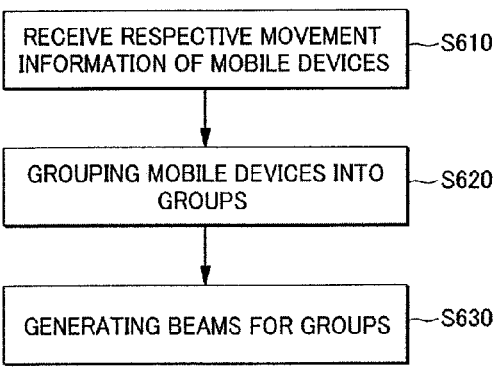
FIG. 6 shows a flow diagram illustrating an example of a process for grouping mobile devices and generating beams for the mobile devices.

FIG. 6 shows a flow diagram illustrating an example of a process for grouping mobile devices and generating beams for the mobile devices in accordance with at least some embodiments described herein. The method in FIG. 6 can be implemented using a base station featuring downlink beamforming system 400 which includes receiving unit 410, grouping unit 420, beam generation unit 430 and updating unit 440 as described above. An example process may include one or more operations, actions, or functions as illustrated by one or more blocks S610, S620 and/or S630. Although illustrated as discrete blocks, various blocks may be divided into additional blocks, combined into fewer blocks, or eliminated, depending on the desired implementation. Processing may begin at block S610.

At block S610, the base station may receive respective movement information of multiple mobile devices. In some embodiments, the movement information may include respective velocity information based on GPS information of the mobile devices. Processing may continue from block S610 to block S620.

At block S620, the base station may group at least some of the mobile devices into one or more groups based on the movement information. In some embodiments, the base station may classify the mobile devices into a low speed group and a high speed group based on the velocity information. A speed of a mobile device in the low speed group is slower than a predetermined speed, and a speed of a mobile device in the high speed group is faster than the predetermined speed. That is, the base station may classify the mobile device moving slower than the predetermined speed as the low speed group and the mobile device moving faster than the predetermined speed as the high speed group.

In some embodiments, the base station may regroup at least some of mobile devices in the low speed group into one or more sub-groups based on positions of the mobile devices in the low speed group. The sub-groups may include two or more mobile devices located in a predetermined range, and the predetermined range may be associated with directions from the base station to mobile devices in the sub-groups. That is, the base station may classify mobile devices located in similar directions from the base station and located in the predetermined range associated with the similar directions as the sub-groups. The predetermined range may be associated with a width of a narrow directional beam generated by the base station. Processing may continue from block S620 to block S630.

At block S630, the base station may generate beams for the respective groups. In some embodiments, the base station may create one or more directional beams and an omni-directional beam. In some embodiments, the base station may generate one or more directional beams for the respective sub-groups and an omni-directional beam for at least one mobile device not belonging to the sub-groups.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
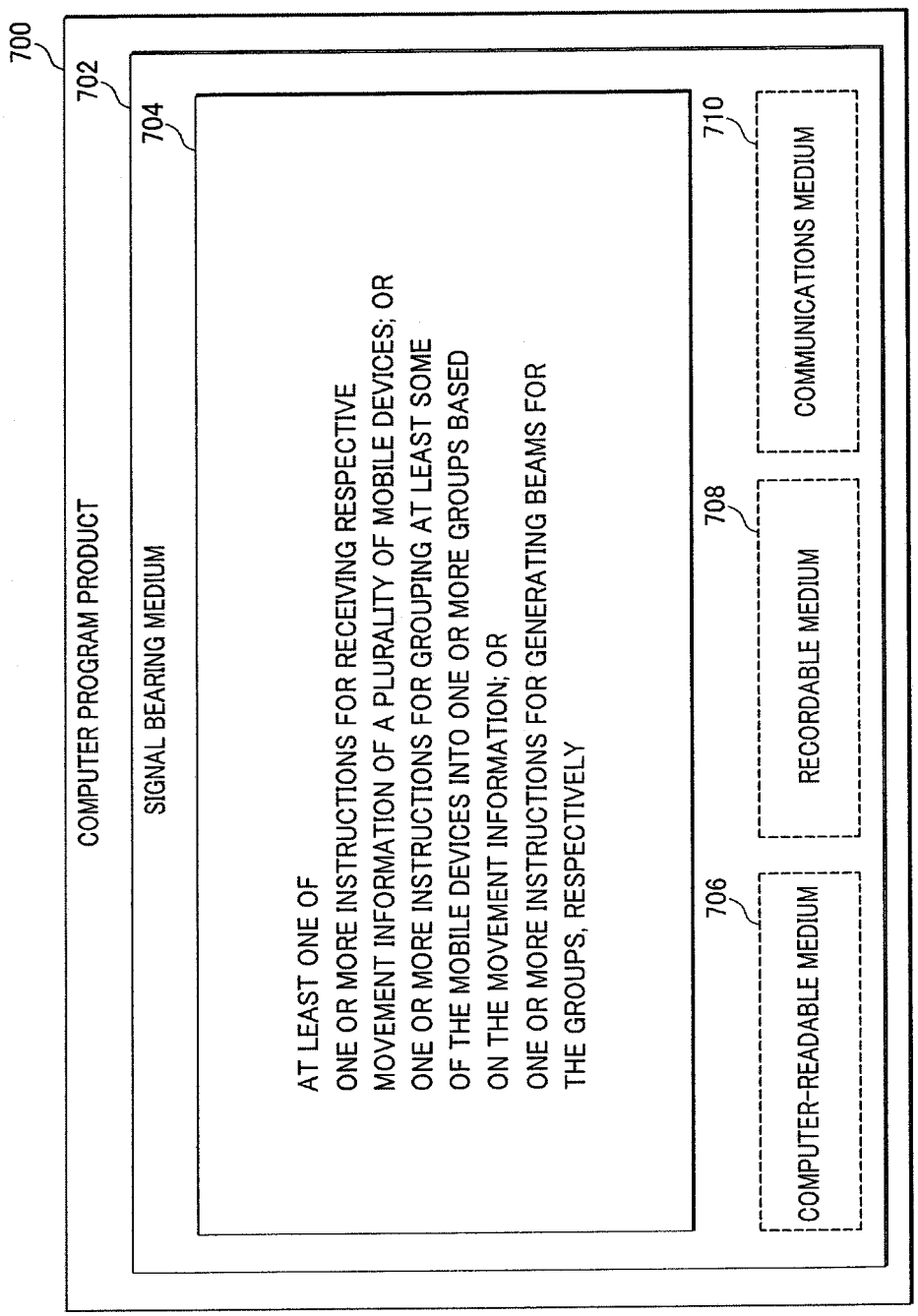
FIG. 7 illustrates computer program products that can be utilized to provide beamforming for wireless communications.

FIG. 7 illustrates computer program products 700 that can be utilized to provide beamforming for wireless communications in accordance with at least some embodiments described herein. Program product 700 may include a signal bearing medium 702. Signal bearing medium 702 may include one or more instructions 704 that, when executed by, for example, a processor, may provide the functionality described above with respect to FIGS. 1-6. By way of example, instructions 704 may include: one or more instructions for receiving respective movement information of a multiple number of mobile devices; one or more instructions for grouping at least some of the mobile devices into one or more groups based on the movement information; and one or more instructions for generating beams for the groups, respectively. Thus, for example, referring to FIG. 4, downlink beamforming system 400 may undertake one or more of the blocks shown in FIG. 6 in response to instructions 704.

In some implementations, signal bearing medium 702 may encompass a computer-readable medium 706, such as, but not limited to, a hard disk drive, a CD, a DVD, a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of downlink beamforming system 400 by an RF signal bearing medium 702, where the signal bearing medium 702 may be conveyed by a wireless communications medium 710 (e.g., a wireless communications medium conforming with the IEEE 802.11 standard).

Figure 8:
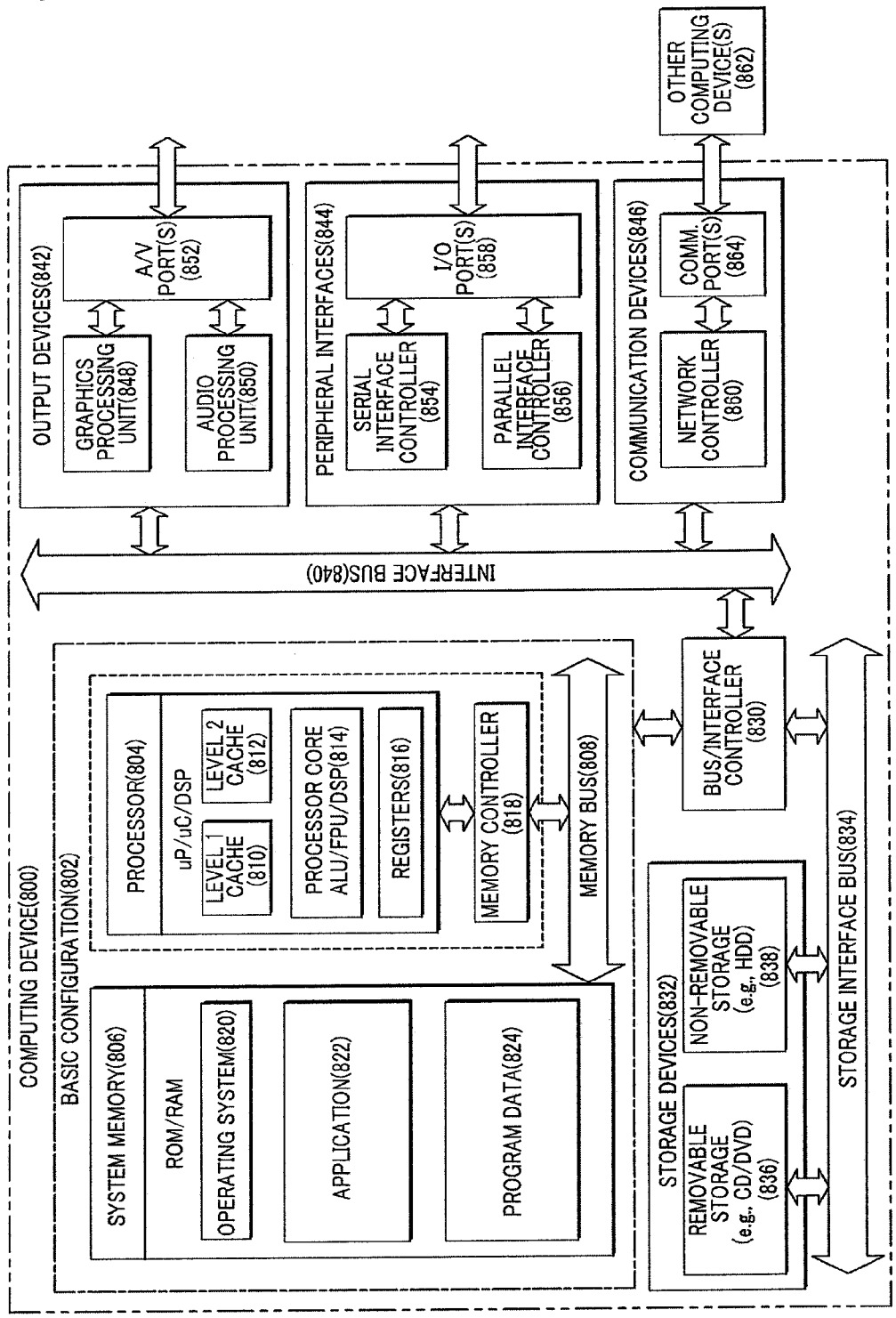
FIG. 8 is a block diagram illustrating an example of a computing device that can be utilized to provide beamforming for wireless communications.

FIG. 8 is a block diagram illustrating an example of a computing device 800 that can be utilized to provide beamforming for wireless communications in accordance with at least some embodiments described herein. In a very basic configuration 802, typically, computing device 800 may include one or more processors 804 and a system memory 806. A memory bus 808 may be used for communication between processor 804 and system memory 806.

Depending on the desired configuration, processor 804 may be of any type including, but not limited to, a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including, but not limited to, volatile memory (such as RAM), non-volatile memory (such as ROM, flash memory, etc.) or any combination thereof. System memory 806 may include an operating system 820, one or more applications 822, and program data 824.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, but not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method performed under control of a downlink beamforming system, comprising:
   receiving respective velocity information of a plurality of mobile devices;
   classifying the plurality of mobile devices into at least one of a low speed group and a high speed group based on the velocity information,
      wherein a speed of a mobile device in the low speed group is slower than a predetermined speed and a speed of a mobile device in the high speed group is faster than the predetermined speed;
   dividing at least some mobile devices in the low speed group into one or more sub-groups based on positions in a predetermined range; and
   generating beams for the low speed group and high speed groups.

2. The method of claim 1, wherein the predetermined range is associated with a direction from a base station including the downlink beamforming system to mobile devices in the sub-groups.

3. The method of claim 1, wherein the generating includes:
   creating one or more directional beams for the one or more sub-groups, respectively.

4. The method of claim 1, wherein the generating includes:
   creating an omni-directional beam for at least one mobile device not belonging to the one or more sub-groups.

5. The method of claim 1, further comprising:
   updating the velocity information periodically.

6. The method of claim 5, wherein the grouping includes:
   regrouping the one or more groups based on the updated velocity information.

7. A downlink beamforming system, comprising:
a receiving unit configured to receive velocity information of a plurality of mobile devices;
a grouping unit configured to:
- classify the plurality of mobile devices into a low speed group and a high speed group based on the velocity information, wherein a velocity mobile device in the low speed group is slower than a predetermined velocity and a velocity of a mobile device in the high speed group is faster than the predetermined velocity, and
- divide at least some mobile devices in the low speed group into one or more sub-groups based on positions in a predetermined range; and a beam generation unit configured to generate beams for the one or more groups, respectively.

8. The downlink beamforming system of claim 7, wherein the beam generation unit includes: a directional beam generation unit configured to generate one or more directional beams for the one or more sub-groups, respectively.

9. The downlink beamforming system of claim 7, wherein the beam generation unit includes: an omni-directional beam generation unit configured to generate an omni-directional beam for at least one mobile device not belonging to the one or more sub-groups.

10. The downlink beamforming system of claim 7, further comprising: an updating unit configured to update the velocity information periodically, wherein the grouping unit is further configured to regroup the one or more groups based on the updated velocity information.

11. A computer-readable storage medium having stored thereon computer-executable instructions that, in response to execution, cause a downlink beamforming system to perform operations, comprising:
- receiving respective velocity information of a plurality of mobile devices;
- classifying the plurality of mobile devices into a low speed group and a high speed group based on the velocity information,
  - wherein a speed of a mobile device in the low speed group is slower than a predetermined speed and a speed of a mobile device in the high speed group is faster than the predetermined speed;
- dividing at least some mobile devices in the low speed group into one or more sub-groups based on positions in a predetermined range; and
- generating beams for the groups, respectively.

* * * * *

UNITED STATES PATENT AND TRADEMARK OFFICE
CERTIFICATE OF CORRECTION

PATENT NO.        : 8,583,151 B2
APPLICATION NO.   : 13/576277
DATED             : November 12, 2013
INVENTOR(S)       : Joo Page 1 of 1

It is certified that error appears in the above-identified patent and that said Letters Patent is hereby corrected as shown below:

In the Claims

In Column 11, Line 7, in Claim 7, delete "velocity" and insert -- velocity of a --, therefor.

Signed and Sealed this
Thirteenth Day of May, 2014

Michelle K. Lee
*Deputy Director of the United States Patent and Trademark Office*